United States Patent [19]

Townsend

[11] Patent Number: 4,593,434
[45] Date of Patent: Jun. 10, 1986

[54] CASING SUPPORT FOR PRODUCT ENCASING MACHINE AND METHOD FOR USING SAME

[75] Inventor: Ray T. Townsend, Des Moines, Iowa

[73] Assignee: Townsend Engineering Company, Des Moines, Iowa

[21] Appl. No.: 704,302

[22] Filed: Feb. 21, 1985

[51] Int. Cl.$^4$ .................... A22C 11/02; A22C 11/10
[52] U.S. Cl. ........................................ 17/49; 17/33; 17/41
[58] Field of Search ................ 17/35, 41, 33, 49, 1 F

[56] References Cited

U.S. PATENT DOCUMENTS

| 4,512,059 | 4/1985 | Beckman | 7/41 X |
| 4,521,938 | 6/1985 | Kupcikevicius | 17/41 X |

FOREIGN PATENT DOCUMENTS

| 454765 | 3/1949 | Canada | 17/41 |
| 1100500 | 2/1961 | Fed. Rep. of Germany | 17/41 |
| 3028831 | 3/1982 | Fed. Rep. of Germany | 17/35 |

Primary Examiner—Willie G. Abercrombie
Attorney, Agent, or Firm—Zarley, McKee, Thomte, Voorhees & Sease

[57] ABSTRACT

A casing support is provided for supporting a product casing on a stuffing horn of a product encasing machine. The support comprises an elongated hollow tube having a longitudinal bore extending therethrough which is sized for slidable fitting over the stuffing horn of a product encasing machine. The hollow tube has an outer surface which receives the sausage casing thereon, and also includes on its outer surface a chuck which engages the casing to provide rotational movement of the casing. Means are provided for detachably securing the tube to the stuffing horn or an ejection nozzle of a product encasing machine. The method of the present invention comprises sliding an elongated hollow casing over a hollow tube, connecting the tube to a stuffing horn or ejection nozzle of a product encasing machine, engaging the casing with a chuck on the tube so as to cause rotational movement of the casing with the tube when the stuffing horn or ejection nozzle are rotated.

15 Claims, 5 Drawing Figures

CASING SUPPORT FOR PRODUCT ENCASING MACHINE AND METHOD FOR USING SAME

BACKGROUND OF THE INVENTION

This invention relates to a casing support for a product encasing machine and method for using same.

Product encasing machines generally comprise an elongated stuffing horn on which is mounted a cylindrical shirred casing. The casing is pulled off the end of the stuffing horn and is filled with product which is forced outwardly from the discharge end of the stuffing tube. A linker or linking machine takes the filled casings and forms them into links.

In order to form the filled casing into links, it is necessary to rotate the casing so as to impart twists to the casing at the various junctures of the links. This rotational action is presently supplied by a rotating chuck which engages the outer surface of the casing and imparts a rotation to it.

Various types of materials are used for casing. Cellulose casing is the most durable, and is the easiest to work with. Collagen casing is also sometimes used. Sticks of shirred collagen casings are often soft and flimsy as compared to cellulose. Therefore, a collagen shirred casing is difficult to feed into the machine automatically. Also because of its soft unrigid condition, the collagen stick tends to expand so that it is difficult to feed and hold the maximum amount of casing on the stuffing horn.

Furthermore, collagen casing is somewhat more delicate and weak than cellulose casing so that it causes more difficulty from a breakage standpoint during the stuffing and linking process.

The third type of casing used is natural casing. Like collagen, the natural casings are quite delicate and are easily damaged during the stuffing and linking operations.

The use of an internal chuck, i.e., a chuck which engages the interior surface of the casing, is more effective in rotating the casing than an external chuck, and therefore can rotate the fragile collagen or natural casing more effectively with less breakage and damage to the casing. However, difficulty is encountered in mounting an internal chuck on the end of the stuffing horn because any chuck on the stuffing horn must be removed each time a new casing is fitted on the horn. It is not very practical to remove the chuck for fitting a new casing on an automatic product encasing machine.

Therefore, a primary object of the present invention is the provision of an improved casing support for supporting a product casing on a product encasing machine.

A further object of the present invention is the provision of an improved casing support wherein a chuck is molded to the end of the casing support and is easily removed from the product encasing machine after the casing has been filled.

A further object of the present invention is the provision of an improved casing support wherein the casing can be shirred onto a thin plastic tube that has a chuck molded onto the end of it.

A further object of the present invention is the provision of a combined tube and chuck having a shirred casing thereon which can be easily fitted over the stuffing horn, or otherwise mounted on the product encasing machine.

A further object of the present invention is the provision of a casing support which can be used for various types of casing and which can be used with a stuffing horn which is either stationary or rotating.

A further object of the present invention is the provision of a new casing support which is inexpensive and can be disposed of after the casing has been filled.

A further object of the present invention is the provision of an improved casing support which includes an internal chuck which provides gentle handling of the more delicate types of casings.

A further object of the present invention is the provision of an improved casing support which is economical to manufacture, disposable in use, and efficient in operation.

SUMMARY OF THE INVENTION

The present invention comprises an elongated plastic tube having an internal casing chuck formed integrally therewith. The casing chuck includes fingers which extend radially outwardly from the tube and which may be completely rigid, or which may be yieldably movable radially inwardly.

The shirred casing stick is preferably placed over the stuffing tube by the casing supplier and shipped in that form.

In order to mount the casing on the stuffing horn, it is merely necessary to slip the tube with the casing thereon over the stuffing horn and to detachably secure the tube to the stuffing horn. The tube may be connected to the stuffing horn so as to be held against only longitudinal movement with respect to the stuffing horn or it can alternatively be attached to the stuffing horn so as to hold it against both longitudinal and rotational movement with respect to the stuffing horn. Alternately, the tube may be connected to a short meat ejection nozzle on the encasing machine when the conventional elongated horn is not used.

The end of the casing is drawn over the chuck and a knot is provided beyond the end of the stuffing tube by the casing supplier so that the casing is ready for filling as soon as the tube is mounted on the machine. The machine is then started and the product is pumped through the stuffing horn (or the nozzle) and into the casing. As the casing is filled, it pulls the unfilled portion of the casing outwardly over the chuck and beyond the end of the stuffing tube.

The chuck engages the interior surface of the casing and provides a rotational force on the casing when the tube is rotated.

When used with a rotating stuffing horn, the tube and chuck are adapted to rotate in unison with the stuffing horn, thereby also imparting a rotational movement to the casing prior to the time it is filled. The rotational motion can be applied by an external rotational force if a rotating horn is not used.

The method of the present invention comprises engaging an elongated hollow tube with a casing thereon with the stuffing horn or nozzle, rotating the tube to cause the chuck thereon to rotate the casing while the casing is being filled, and then removing the tube from the machine after the casing has been filled and pulled from the tube during the encasing process.

DETAILED DESCRIPTION OF THE PREFERRED EMBODIMENT

Figure 1:
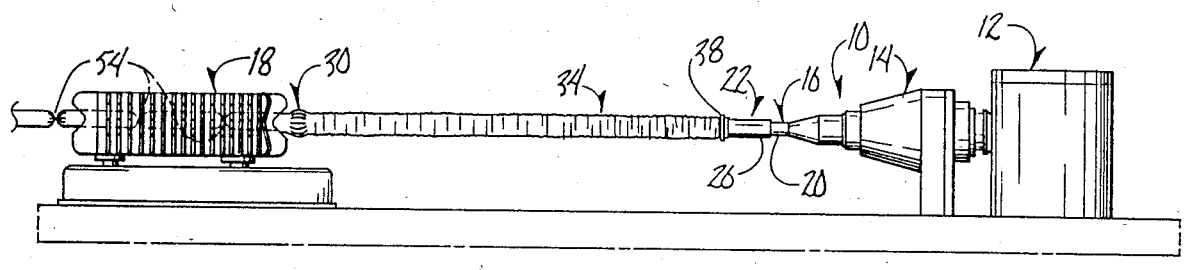
FIG. 1 is an elevational view of a sausage casing machine on which the present invention is used.
Figure 2:
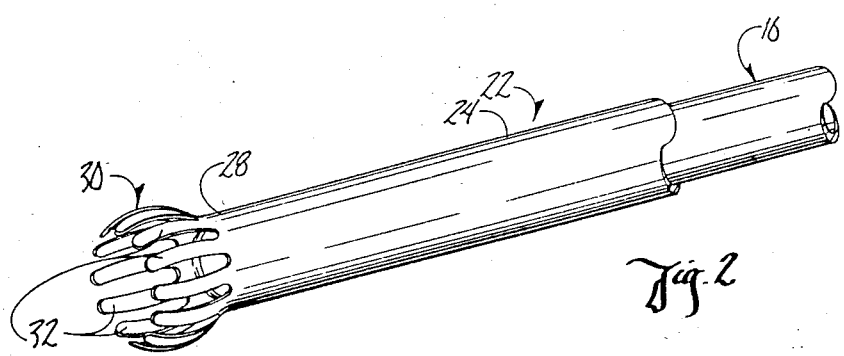
FIG. 2 is a partial perspective view of a stuffing horn having the casing support of the present invention mounted thereon. The casing is not shown to be on the casing support in this figure.

Referring to the drawings, the numeral 10 generally designates a product encasing machine comprising a product pump 12, a stuffing horn support 14, a stuffing horn 16, and a linking mechanism 18. Stuffing horn support 14 is adapted to rotate stuffing horn 16. Stuffing horn 16 includes a first end 20 which is operatively connected to the stuffing horn support 14 and is in communication with product pump 12 so as to receive product therefrom. Stuffing horn 16 includes a discharge end 21.

The numeral 22 generally designates the casing support of the present invention which comprises a support tube 24 having a rearward end 26 and a forward end 28. Integrally formed with tube 24 is an internal casing chuck 30 which is comprised of a plurality of chuck fingers 32 which are arranged in spaced apart relationship around the circumference of tube 24 adjacent the forward end 28 thereof. Each chuck finger 32 extends radially outwardly and extends axially forwardly with respect to support tube 24. The rearward ends of each finger 32 are each anchored to support tube 24 and extend forwardly therefrom. Also, each finger 32 is somewhat arcuate in shape from its rearward end to its forward end so as to provide a smooth continuous surface for engaging the interior of the casing. Fingers 32 can be completely rigid or can be yieldable in an inward radial direction in response to pressure.

Figure 3:
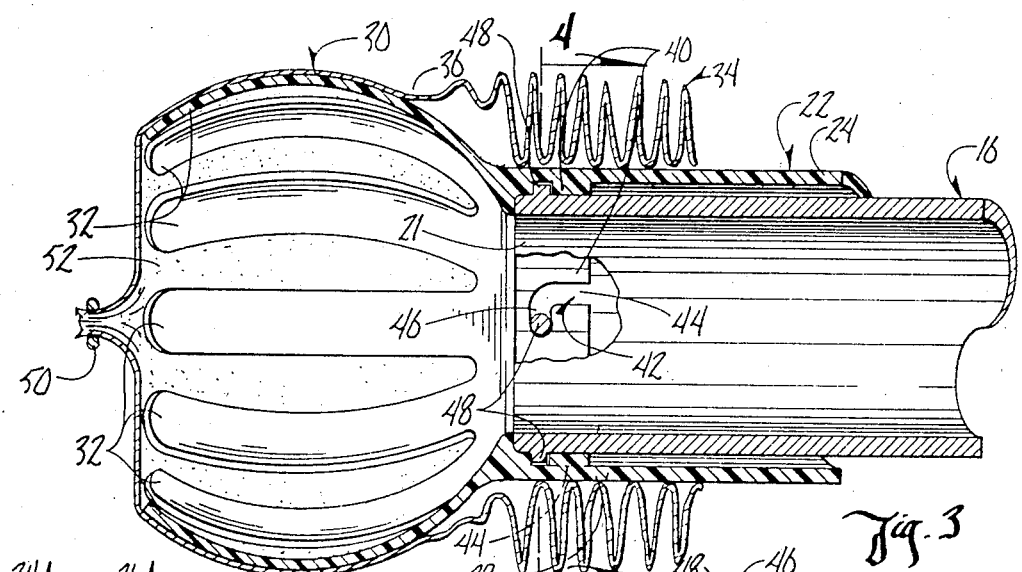
FIG. 3 is a sectional view of the end of the tube and stuffing horn showing the relationship of the casing to the chuck on the casing support.

Mounted over the outside surface of support tube 24 is a shirred casing stick 34 which comprises an elongated cylindrical casing 36 which has been crumpled and shirred in an accordian-like fashion, such as shown in FIG. 3, so as to reduce its length. A detachable snap ring 38 is mounted over tube 24 rearwardly of the rearward end of casing stick 34 so as to hold the casing stick against rearward movement on tube 24.

Tube 24 includes means for detachably securing the tube 24 to stuffing horn 16. This securing means comprises an annular ring 40 which is formed on the interior of tube 24 and which is adapted to slide over the outer surface of stuffing horn 16. Provided in the interior surface of ring 40 are a plurality of bayonet slots 42 each having an axially extending portion 44 and a circumferentially extending portion 46. Bayonet slots 42 are adapted to receive pins 48 on the outer surface of stuffing horn 16 in the manner shown in FIGS. 3 and 4. The circumferentially extending portions 46 of slots 42 prevent a rotational movement of the pin 46 and also prevent longitudinal movement of the pin 46 so as to secure tube 24 against both rotational and longitudinal movement with respect to stuffing horn 16.

The pins 48 could also be mounted on the opposite end of horn 16, with bayonet slots 42 being formed on the opposite end of tube 24, rather than on the end shown in FIG. 3.

Figure 5:
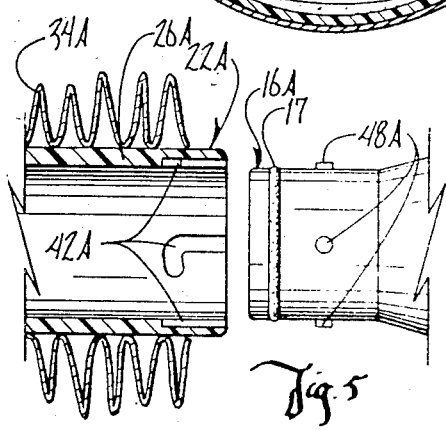
FIG. 5 is an exploded schematic view of a tube about to be conncted to a short, meat injection nozzle.

In the alternate form of the invention shown in FIG. 5, a horn 16 is eliminated, and a short meat injection nozzle 16A is used in lieu thereof, and is connected to support 14 as was horn 16. A tube 24 having bayonet slots 44A and a shirred casing 36 thereon is connected to nozzle 16A by engaging pins 48A in slots 44A. Sealing ring 17 seals tube 24 on the nozzle 16A to prevent the escape of meat emulsion.

In operation, the casing support 22 is pre-assembled on the premises of the supplier. The casing stick 34 is mounted over the tube and engages the rearward end of the casing chuck 30. Detachable ring 38 is then placed over the rearward end of the tube so as to hold the casing on the tube 24.

Figure 4:
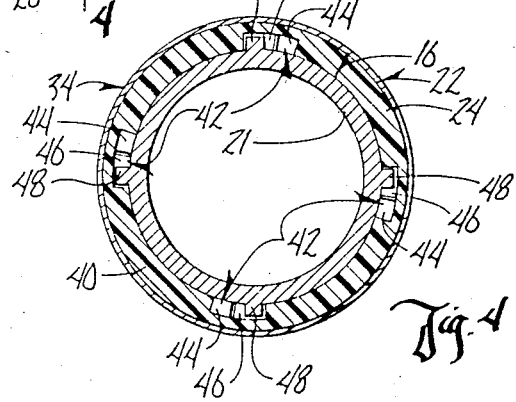
FIG. 4 is a sectional view taken along line 4—4 of FIG. 3.

The tube 24 is slipped over the end of stuffing horn 16 and is secured to stuffing horn 16 by means of pins 48 in bayonet slots 44 as shown in FIGS. 3 and 4. With the pins 48 within slots 44, the tube 24 is held against rotational and longitudinal movement with respect to stuffing horn 16.

The casing 30 is drawn axially forwardly over the fingers 32 and is tied or knotted forwardly of fingers 32 as indicated at 50. This normally has been done by the casing supplier. The fingers 32 have a collective outer diameter that is compatible with the inner diameter of the casing so as to be able to impart rotation to the casing when the tube 24 is rotated.

The encasing machine is then started with pump 12 providing a continuous flow of product through support 14 into stuffing horn 16 and outwardly through the discharge end 20 of the stuffing horn 16. As the product (designated by the numeral 52) engages the casing forwardly of the chuck 30, it draws the casing forwardly off the end of the tube 24, with the fingers 32 providing a rotational movement to the casing 36.

When a rotatable stuffing tube is used, the support tube 24 rotates in unison with the stuffing horn 16, and the fingers 32 impart the rotation to the casing 36 as it is being filled. This rotational movement of the filled casing is important so as to permit the formation of twists or nodes 54 between each of the links as they pass through the linking machine 18.

The support 22 is advantageous because it can be easily removed and replaced. All that is necessary to remove the tube 24 is to rotate it and slide the pins 48 out of engagement with bayonet slots 44. The tube 24 can then be disposed of or used again if desired.

Particularly important with respect to the present invention is the fact that the chuck 30 is integrally formed with the tube 24 so that the two can be mounted at the same time with the casing. If the chuck 30 were attached to the forward end of the stuffing horn 16, it would be necessary to remove the chuck each time a new casing was loaded on the stuffing horn. However with the present invention, it is not necessary to remove the chuck because it is integrally formed with the support tube 24.

With reference to the alternate form of the invention in FIG. 5, the tube 24A is mounted directly on nozzle 16A in the manner described heretofore. Rotational motion is imparted to the tube 24A by either rotating nozzle 16A, or by some external rotating force (not shown). On such a device, the integral chuck on the opposite end of tube 24A imparts rotation to the casing 36 just as did the chuck 30 in FIG. 3.

Thus, it can be seen that the device accomplishes at least all of its stated objectives.

What is claimed is:

1. A casing support for supporting a product casing on
a product encasing machine, said casing support comprising:
an elongated hollow tube having a longitudinal bore extending therethrough, said bore having a forward first open end and a rearward second open end,
said hollow tube having an outer surface for receiving said product casing thereon;
chuck means on said outer surface of said tube for engaging the interior surface of said casing to provide rotational force to said casing when said tube is rotated, and for providing longitudinal drag to said casing to yieldably resist movement of said casing in a forward direction;
means for detachably securing said tube to said product encasing machine for holding said tube against at least longitudinal movement with respect to said product encasing machine;
said chuck means comprising a plurality of elongated fingers arranged in spaced relation to one another around the circumference of said tube, each of said fingers having a forward end and a rearward end, said rearward end being connected to said tube, each of said fingers extending radially outwardly and forwardly from said rearward end and being arcuate in shape along the distance from said forward end to said rearward end so as to provide a smooth continuous surface for engaging said interior of said casing.

2. A casing support according to claim 1 comprising said means for detachably securing said tube to said product encasing machine and also being adapted to rotate with respect to said product encasing machine.

3. A casing support according to claim 1 wherein said radially outwardly extending portion of said chuck means is yieldably movable in an inward radial direction.

4. A casing support according to claim 1 wherein said tube and said chuck means are of unitary construction.

5. A casing support according to claim 4 wherein said tube and chuck means are constructed of plastic and are disposable after use.

6. A machine for encasing product comprising:
a support means,
a pump means on said support means for pumping the product to be encased,
a meat injection means having an open end rotatably mounted on said support means and being in communication with said pump means for receiving the product to be encased for discharge from said open end,
an elongated hollow tube detachably secured to said meat injection means, said tube having a forward tube end and a rearward tube end;
a chuck means on said hollow tube adjacent said forward end thereof,
an elongated casing means slidably mounted on said tube and having an internal surface in engagement with said chuck means, whereby said chuck means will provide rotational movement to said casing when said tube is rotated and will provide a dragging force yieldably resisting forward movement of said casing on said tube,
a linking means on said support means adjacent said forward end of said tube for receiving and linking casing which has been filled by product discharged from the forward end of said tube and pulled over said chuck by said discharged product;
said chuck means comprising a plurality of fingers arranged in spaced relation to one another around the circumference of said tube, each of said fingers having a rearward finger end connected to said tube and extending radially outwardly and axially forwardly from said rearward finger end to a forward finger end, each of said fingers being arcuate in shape along the distance from said rearward finger end to said forward finger end so as to provide a smooth continuous surface for engaging the interior of said casing.

7. A machine according to claim 6 wherein said tube is detachably secured to said meat injection means by securing means comprising a pin and a bayonet slot, one of said pin and said bayonet slot being on said tube and the other of said pin and bayonet slot being on said meat injection means.

8. A machine according to claim 6 wherein each of said fingers of said chuck means is yieldably movable in an inward radial direction.

9. A machine according to claim 6 wherein said tube and said chuck means are of unitary construction.

10. A machine according to claim 9 wherein said tube and chuck means are constructed of plastic and are disposable after use.

11. A machine according to claim 6 wherein a rotatable stuffing horn is on said injection means, and said tube is detachably mounted on said stuffing horn and is rotatable thereby.

12. A machine according to claim 6 wherein a rotatable product ejection nozzle is on said injection means, and said tube is detachably mounted on said product ejection nozzle and is rotatable thereby.

13. A method of making an encased product comprising:
mounting a shirred casing having opposite ends on an elongated hollow tube having a rear opening on a rearward end and a chuck means on the other forward end, said chuck means comprising a plurality of fingers arranged in spaced relation to one another around the circumference of said tube, each of said fingers having a rearward finger end connected to said tube and extending radially outwardly and axially forwardly from said rearward finger end to a forward finger end, each of said fingers being arcuate in shape along the distance from said forward finger end to said rearward finger end so as to provide a smooth continuous surface for engaging the interior of said casing;
pulling one of said opposite ends of said shirred casing forwardly over said chuck means;
mounting said elongated tube to a product encasing machine adapted to force product through said chuck means;
forcing product forwardly through said chuck means and into said casing whereby said casing will be filled and be continuously drawn forwardly over said chuck means,
rotating said tube during the time that product is forced through said chuck means whereby said chuck means will impart rotational movement to said casing and will provide a yieldable dragging force to said casing to yieldably resist forward movement of said casing.

14. The method of claim 13 wherein said tube is telescopically mounted over a hollow elongated rotatable product stuffing horn of a product encasing machine.

15. The method of claim 13 wherein said tube is connected to a product ejection nozzle of a product encasing machine.

* * * * *